United States Patent [19]

Swis et al.

[11] 3,942,363

[45] Mar. 9, 1976

[54] DRIVE-DYNAMOMETER SYSTEM

[75] Inventors: Philip E. Swis, Armada; Glenn M. Brown, Royal Oak, both of Mich.

[73] Assignee: The Cross Company, Fraser, Mich.

[22] Filed: Feb. 28, 1975

[21] Appl. No.: 553,920

Related U.S. Application Data

[60] Continuation-in-part of Ser. No. 464,061, April 25, 1974, abandoned, which is a division of Ser. No. 363,054, May 23, 1973, Pat. No. 3,834,221.

[52] U.S. Cl. .................................... 73/116; 73/134
[51] Int. Cl.[2] .......................................... G01L 3/20
[58] Field of Search ................. 73/116, 134; 91/505

[56] References Cited
UNITED STATES PATENTS

| | | | |
|---|---|---|---|
| 3,050,993 | 8/1962 | Draughon et al. | 73/116 |
| 3,298,224 | 1/1967 | Birchall et al. | 73/134 |
| 3,465,680 | 9/1969 | Saila | 91/505 |
| 3,785,216 | 1/1974 | McLean et al. | 73/134 |

Primary Examiner—Jerry W. Myracle
Attorney, Agent, or Firm—Harness, Dickey & Pierce

[57] ABSTRACT

A drive-dynamometer system particularly adapted for automated testing of parts such as vehicle engines. The dynamometer is a hydrostatic system having a fixed displacement motor connected to, and a variable displacement pump spaced from the part being tested, the pump having motor means for driving it. The system has a closed hydraulic loop connecting the motor and the pump whereby the engine may be selectively cold-tested or hot-tested, the motor during hot-testing acting as a pump and the pump acting as a motor which therefore drives its motor means. Preferably, this comprises a synchronous electric motor, which, when acting as a generator, creates useful electric power for the plant in which the unit is installed. Means are provided for adjusting the displacement of the pump, and a control loop system is provided for the pump adjusting means to simulate different load or inertia conditions. The fixed displacement motor has two motive connections, and a device is preferably provided for sensing the pressure differential between said connections to indicate positive or negative torque.

13 Claims, 5 Drawing Figures

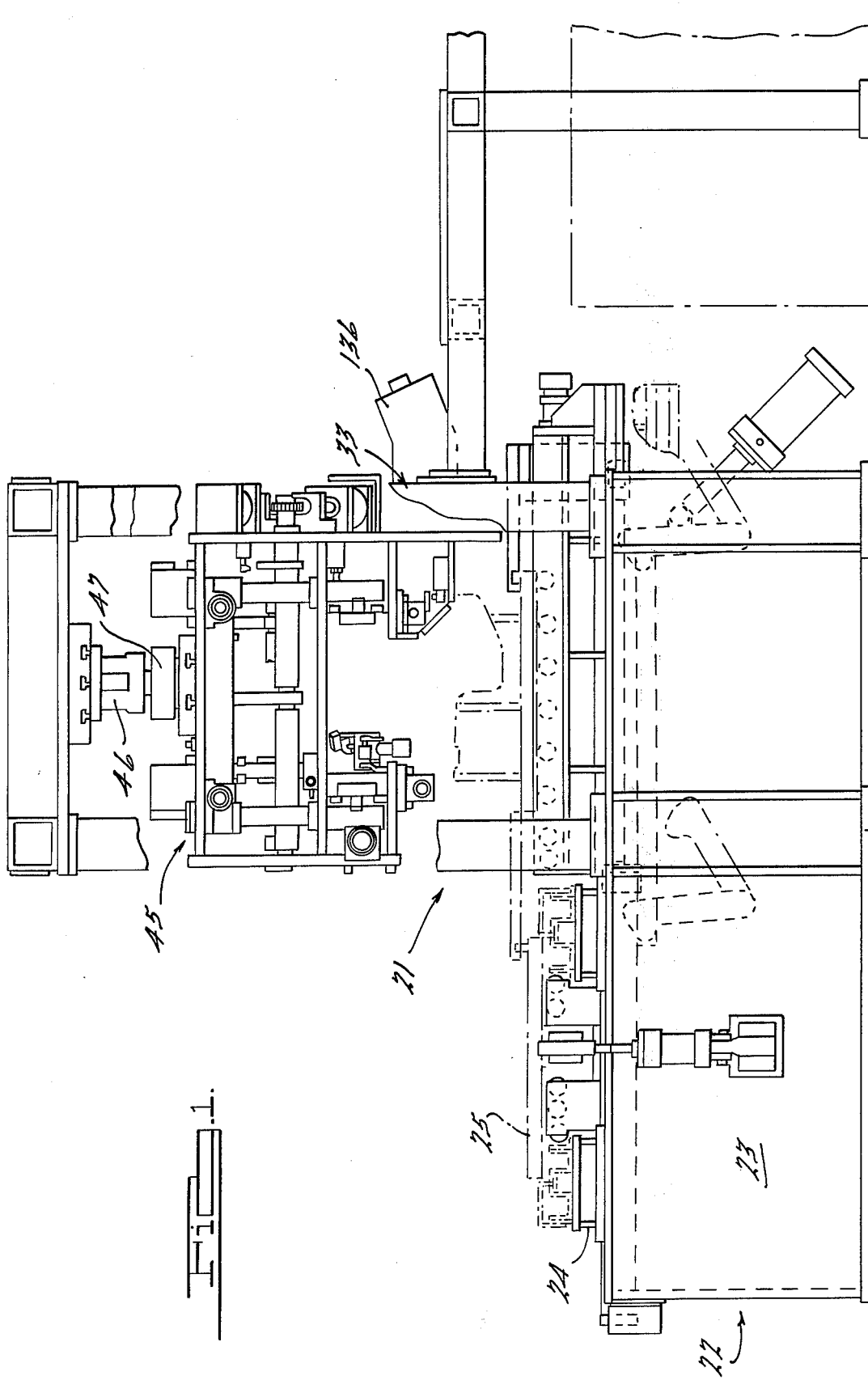

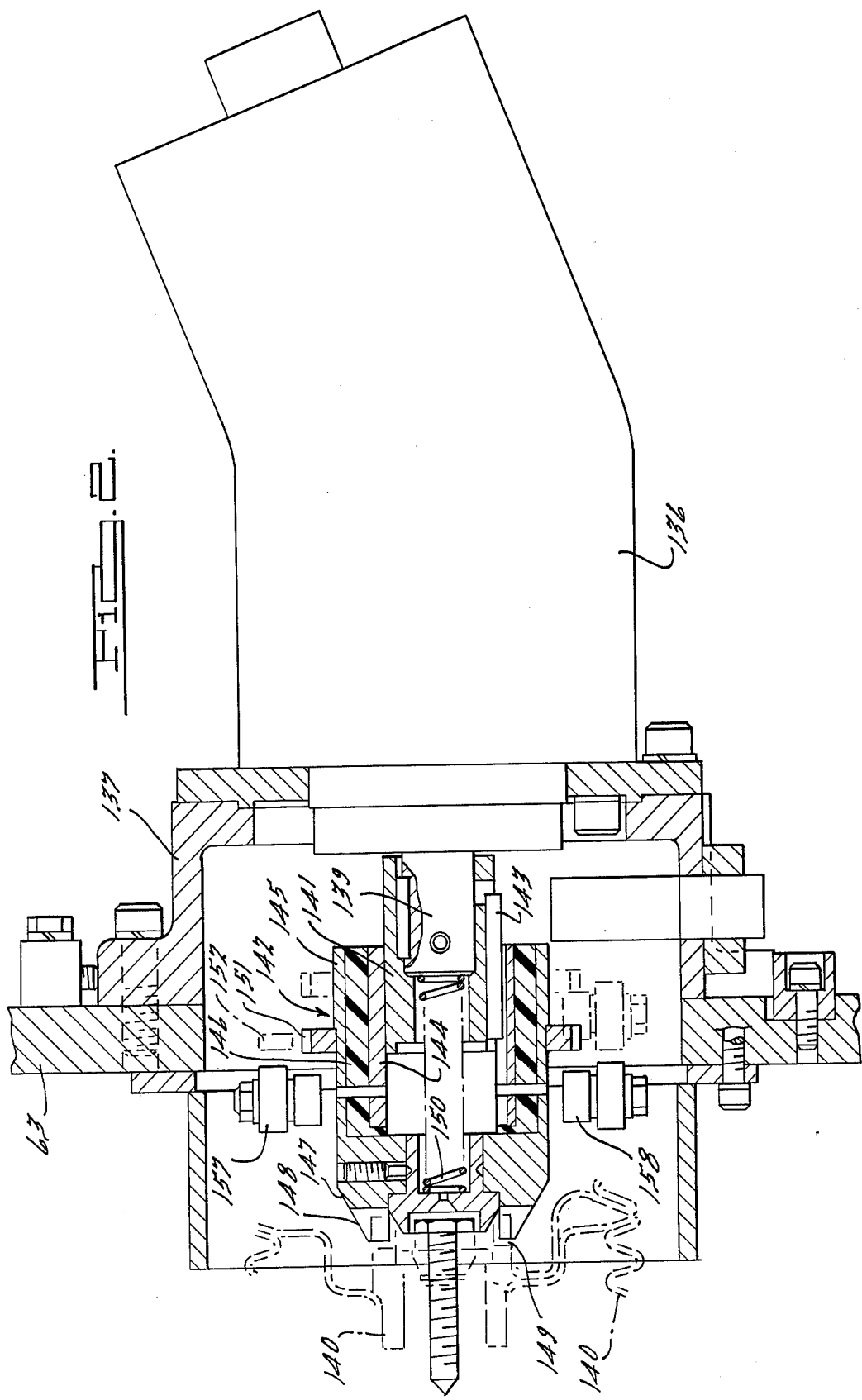

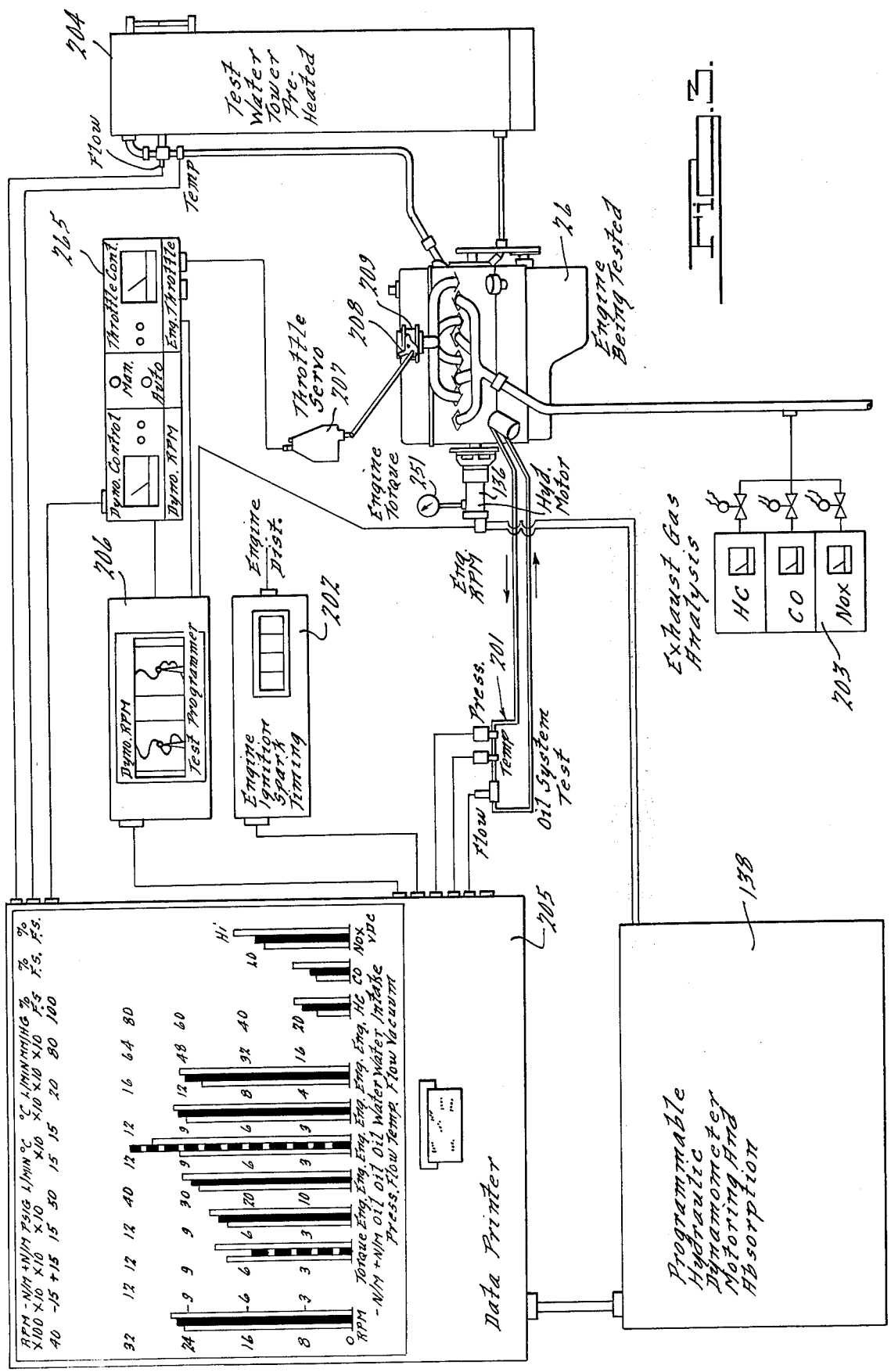

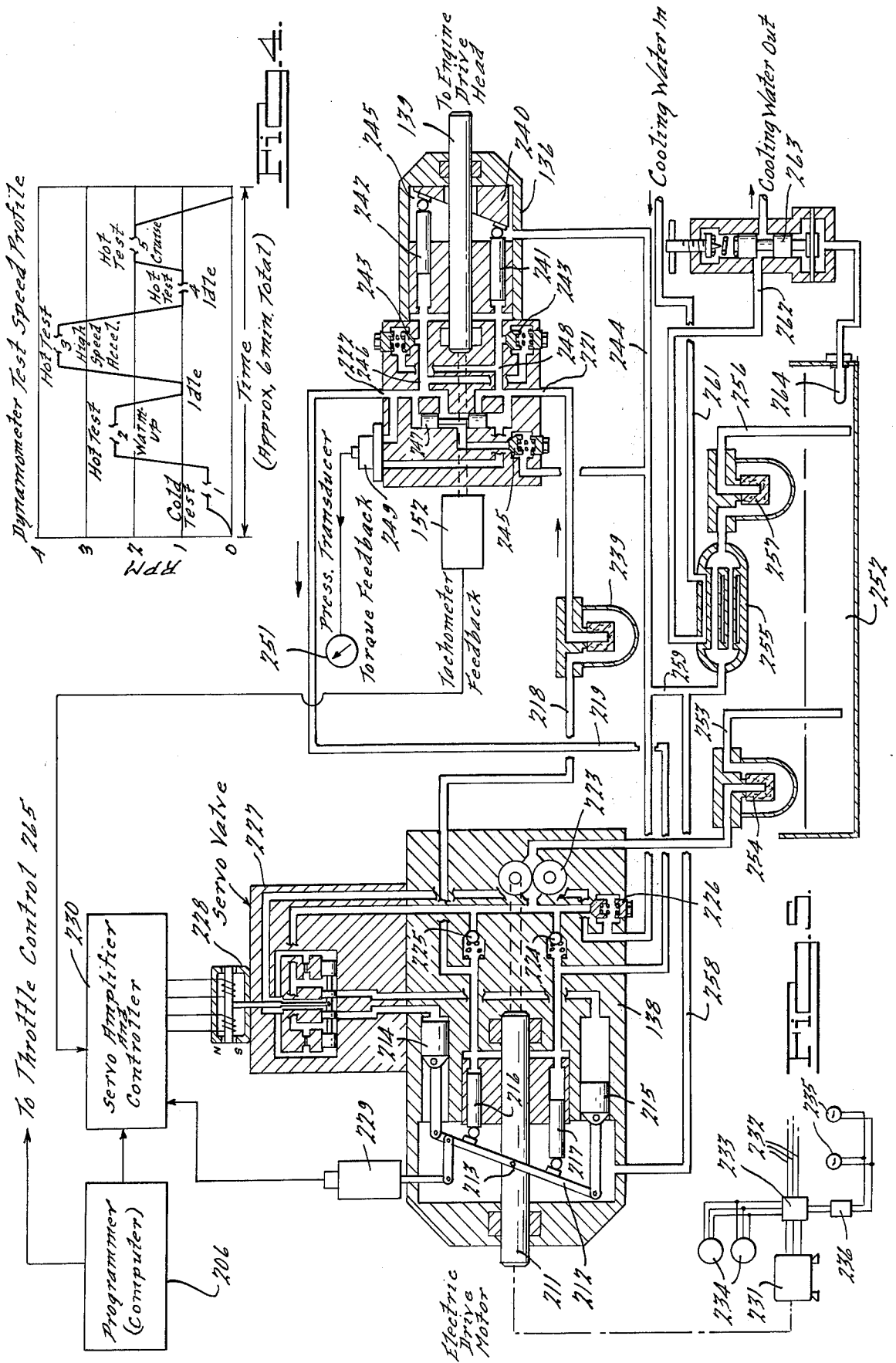

3,942,363

DRIVE-DYNAMOMETER SYSTEM

This application is a continuation-in-part of application Ser. No. 464,061 filed Apr. 25, 1974 now abandoned and entitled Test Stand for Vehicle Engines, which application was in turn a division of application Ser. No. 363,054 filed May 23, 1973, now U.S. Pat. No. 3,834,221.

BACKGROUND OF THE INVENTION

1. Field of the Invention

The invention relates to dynamometers, and more particularly to equipment for torque-testing internal combustion engines in an automated manner under varying loads and inertia conditions.

2. Description of the Prior Art

The closest prior art known to applicants is that cited in the aforementioned copending application Ser. No. 464,061. However, these prior devices have deficiencies as pointed out in the file history of that application.

BRIEF SUMMARY OF THE INVENTION

It is an object of the invention to provide a novel and improved drive-dynamometer system which enables an engine to be selectively cold-tested or hot-tested, with a control loop system to simulate different load or inertia conditions.

It is another object to provide a test system of this nature which permits power created during hot-testing to be transformed into useful energy.

It is also an object to provide a drive-dynamometer system of this character which is especially adapted for automated testing and in which highly accurate measurements may be accomplished.

Briefly, the invention comprises means supporting an engine to be tested and a hydrostatic system comprising a fixed displacement motor connected to the engine crank shaft and a variable displacement pump spaced from the motor and having motor means for driving it, the system being a closed hydraulic loop system unobstructed in either direction throughout its extent connecting said motor and pump whereby the engine may be selectively cold-tested or hot-tested, the motor during hot-testing acting as a pump and the pump acting as a motor, means for adjusting the displacement of the pump, and a control loop system for the pump adjusting means to simulate different load or inertia conditions.

BRIEF DESCRIPTION OF THE DRAWINGS

FIG. 1 is a side elevational view of a test stand station incorporating the invention;

FIG. 2 is a side elevational view, partly sectioned, of the drive connection between the hydraulic motor and engine crank-shaft;

FIG. 3 is a diagrammatic layout of a typical production system for total engine analysis incorporating the drive-dynamometer system of this invention;

FIG. 4 is a chart showing a test speed profile for the dynamometer; and

FIG. 5 is a schematic view of the system.

DESCRIPTION OF THE PREFERRED EMBODIMENT

The invention is shown in conjunction with a test stand generally indicated at 21 for testing engines 26 (reference numerals are those of the parent applications). Although the details of the test stand do not in themselves form part of the present invention, it may be mentioned that the stand has a base generally indicated at 22 supporting a portion 23 having a conveyor 24 which passes the test stand entrance. The conveyor is adapted to carry pallets 25 on which the engines rest. The conveyor carries these engines past a plurality of stations, one of which has the test stand. As each engine 26 reaches that station, it is diverted into the test stand and returned to the conveyor after the testing is completed.

The test stand comprises an open frame generally indicated at 33 supporting an inverted cradle generally indicated at 45 in a manner permitting the cradle to rock on vertical and horizontal axes by means of bearing assemblies 46, 47. Means are provided for locking the cradle with respect to the frame so that it will be properly aligned when the engine is positioned therein, and for certain portions of the testing procedure. Means are also provided for securely locking engine 26 to cradle 45 in an accurate reference position.

During another portion of testing cradle 45 will be unlocked from frame 22 and its dynamic unbalance measured by means such as seismic sensors activated by sensing probes. The unreferenced parts mentioned above are described and shown in further detail in the aforementioned applications.

When engine 26 is to be cold-tested, that is, driven from a source of rotary power, the hydraulic motor 136 is used. This motor, which may be of an axial piston fixed displacement swash plate construction, is mounted by a bracket 137 on forward plate 63 of cradle 45 (FIG. 2). Motor 136 is preferably a relatively small, lightweight unit driven by a larger and heavier variable displacement hydraulic pump indicated in dot-dash lines at 138 in FIG. 1 which rests on the floor alongside test stand 21. The hydrostatic system comprising motor 136 and pump 138 may be closed hydraulic loop, open control loop system with fixed mechanical stops on the variable displacement pump to permit repetitive accuracy at selected test speed settings. Alternatively, repetitive accuracy may be achieved without fixed stops by a closed control loop system.

With a closed control loop arrangement, engine 26 may be hot-tested using hydraulic motor 136 as a pump and pump 138 as a motor. The displacement of hydraulic unit 138 would be varied to simulate different load or inertia conditions imposed on the engine being tested, such as uphill or downhill conditions.

An output shaft 139 of motor 136 is coaxial with the engine crankshaft, the hub and associated sheaves of which are indicated in dot-dash lines at 140 in FIG. 2. A sleeve 141 is fixedly keyed to shaft 138 and carries an elastomer coupling generally indicated at 142. This coupling is slidably mounted on the sleeve and connected thereto by a key 143. The coupling has a metallic inner member 144, a metallic outer member 145 and an elastomer intermediate element 146, elements 144, 145 and 146 being bonded together. The elastomer element, for example, may be of 60 durometer urethane, allowing approximately 0.010 inch to 0.015 inch misalignment. This member also serves as an isolation damper, dynamically uncoupling the driven member 145 from the other parts and serves to further reduce the ratio of parasitic weight to weight of the engine.

The outer end of member 145 has a conical surface 147 for centering purposes with respect to the crankshaft hub. A pair of driving lugs 148 extend from surface 146 and are receivable by a pair of slots indicated in dot-dash lines at 149 on the crankshaft hub. Coupling 142 is urged to its crankshaft engaging position by a helical coil compression spring 150 disposed between the outer end of coupling 142 and shaft 139. A toothed member 151 is mounted on member 145 and a sensor 152 adjacent this member is used to measure rotational speed.

Means are provided for retracting coupling 142, this means comprising a forked lever having jaws 157 with roller bearings 158 positioned on opposite sides of member 145. When the forked lever is actuated by a motor (not shown) rollers 158 will engage gear 151 to retract the sleeve to its dot-dash line position shown partially in FIG. 2.

FIG. 3 shows a suitable system for engine analysis on a production basis which incorporates the drive-dynamometer system of this invention. Parts of this system not directly relevant to the present invention would include oil system test equipment generally indicated at 201, engine ignition spark timing gear 202, exhaust gas analysis equipment 203, a pre-heated test water tower 204 and a data printer 205. A test computer or other programmer 206 is connected through data printer 205 to dynamometer 138. Dynamometer 138 is actuated by programmer 206 to motor (drive) engine 26 through hydraulic motor 136 or absorb output torque of engine 26 when running hot while holding a commanded speed. Dynamometer 138 will follow a given speed profile either in a motoring mode (engine 26 not firing) or an absorbing mode (engine firing and developing output power). The term "profile" relates to the outline of the curve which the engine or throttle is profiled to follow.

A hydraulic servo 207 is attached to the throttle mechanism 208 of engine 26 at carburetor 209. This throttle servo is controlled by programmer 206. Upon the command of the programmer, it will follow a throttle position angle profile. The engine throttle position determines engine output torque. The engine speed is controlled by dynamometer 138. The combination of dynamometer speed control and engine throttle control will duplicate the basic running conditions that the engine will experience in the vehicle on the road. For example, these conditions could be idling and load; light, medium and heavy acceleration; light and medium load cruise; and light and medium deceleration.

FIG. 4 shows a typical dynamometer test speed profile over a test period of approximately 6 minutes. The first step would be cold-testing of engine 26, that is, with the engine not firing. This would be followed by a warm up hot-test, then an idle test, a high speed acceleration hot-test, in idle hot-test and a cruise hot-test.

FIG. 5 is a hydraulic and schematic circuit diagram of the drive-dynamometer system. Portions of the system shown in FIG. 5 are disclosed in January, 1971 Bulletin No. 9522-A of Sundstrand Hydro-Transmission Division of Sundstrand Corporation. Dynamometer 138 has a shaft 211 carrying a swash plate 212 pivoted at 213. The swash plate is adjusted by servo cylinders 214 and 215 and drives or is driven by working pistons 216 and 217. The pistons are connected by lines 218 and 219 respectively to the ports 221 and 222 of fixed displacement motor 136. An integral synchronized makeup pump 223 prevents cavitating at unit 138 and permits the unit to run in either direction. Double charge check valves 224 and 225 allow pump 223 to feed either side of the unit, and a charge release valve 226 regulates the supercharge pressure.

Servo control cylinders 214 and 215 are connected to a servo valve 227 which in turn has a torque motor 228 connected to programmer 206. It should be understood that torque motor 228 could be subject to manual or other programming means within the principles of the invention. A feedback potentiometer 229 is linked to swash plate 212 and connected to servo amplifier and controller 230 as a feedback indication of the swash plate position so as to keep the servo control at null for a given swash plate setting selection. Programmer 206 is also connected to servo amplifier and controller 230 for setting the desired output of the pump 138, the electrical signal from potentiometer 229 being summed with that of programmer 206 to control torque motor 228. Suitable units for accomplishing these functions are Moog Sundstrand servo amplifiers and controllers, described in Sundstrand Hydro-Transmission Bulletin No. 9565, Revision B, May 1971, page 8.

Shaft 211 is connected to an electric motor 231 which either drives unit 138 when it acts as a pump or is driven by the unit when it acts as a motor. Electric drive motor 231 could suitably be a standard AC brushless 3-phase synchronous motor with a constantly applied voltage from a 3-phase main supply 232 of 240 volts. Supply 232 could be that which feeds other portions of a plant through a supply bus 233, and thus supplies consuming units such as electric motors 234 and lighting units 235 through a transformer 236. It is one of the advantages of the present invention that when unit 138 acts as a motor it will drive electric motor 231 at a speed higher than at its normal speed. The motor will then become a generator and supply electricity through supply bus 233 to electric motor 234, lighting units 235 and other consuming units in the plant.

Fluid connections 218 and 219 extend between units 138 and 136, with appropriate filtering means such as that indicated at 239. Fixed displcement motor 136 is provided with a swash plate 240 connected to shaft 139 and operating pistons 241 and 242. High pressure relief valves 243 are provided at motor 136 for line 238 and a low pressure oil line 244 connects chamber 245 of motor 136 to servo valve 227. Charge pressure relief valve 226 of unit 138, as well as a charge pressure relief valve 245 at unit 136, are connected to line 244. A conduit 246 leads from piston 242 to valve 245, a shuttle valve 247 being interposed in this line. A line 248 leads from piston 241 through shuttle valve 247 to the relief valve 245. The ends of shuttle valve 247 are connected to lines 218 and 219 so that the shuttle valve position will be controlled by the pressure differential between these two lines. A differential pressure transducer 249 is connected to ports 221 and 222 and controls an indicator 251 which will indicate either positive or negative torque, depending upon the running conditions. It has been found that this method of indicating positive or negative torque is highly accurate.

A reservoir 252 is provided having a conduit 253 leading to filter means 254 to the inlet side of makeup pump 223. A heat exchanger 255 is provided for maintaining the hydraulic fluid at a constant temperature, the exchanger being connected by a line 256 and filter means 257 to reservoir 252 and by conduits 258, 259 to unit 138 and conduit 244 respectively. A cooling water inlet conduit 261 and an outlet conduit 262 are connected to heat exchanger 255, the outlet conduits having a control valve 263 connected to a temperature sensor 264 in reservoir 252.

In operation, assuming it is desired to conduct a test on engine 26 with a speed profile like that in FIG. 4, a programmer 206 will first signal controller 230 to set torque motor 228 so that pump 138 will drive motor 136 at a rate which will rotate engine 26 at, say, 500 rpm. Speed sensor 152 will signal the rotational speed of the engine to servo amplifier and controller 230 to give closed-loop speed control through torque motor 228 and servo valve 227 which will adjust swash plate 212 in order to maintain a constant rotational speed. Sensor 152 may suitably be a DC tachometer which acts as the feedback transducer or a pulse-type non-contacting velocity transducer. During this time electric motor 231 will be driving pump 138 so that there will be a current drain from supply bus 233. Pressure transducer 249 connected between the two motive connections 221 and 222 of motor 136 will sense the pressure differential between these connections and indicate the torque (considered negative) applied to engine 26 at indicator 251 and data printer 205 which is not shown in FIG. 5.

Following a predetermined cold-test time, engine 26 will be started for the warm-up hot-test shown in FIG. 4. Programmer 206 will cause throttle servo 207 to follow a throttle position angle profile through a control 265 (FIG. 3). This will determine output torque, with engine speed being controlled by the setting of unit 138 as controlled by the programmer. The speed may be somewhat higher than the cold-test speed, perhaps 2500 rmp after a short period of acceleration. At this time, unit 136 will be acting as a pump and unit 138 as a motor driven thereby. Electric motor 231 will speed up and act as a generator, feeding electrical energy to supply bus 233 and thence to the consuming units in the plant such as electric motors 234 and lighting units 235. This will reduce the amount of power needed from the main electrical supply 232. As before, engine rpm and swash plate position will be fed back into controller 230 so that a constant speed will be maintained. Changes in torque will again be indicated at unit 251, but this time the differential pressure will be in the opposite direction, showing positive torque. The remaining portions of the test speed profile will be carried out in a similar manner.

In the illustrated embodiment of the invention the two independently programmable variables are throttle opening and speed. That is, programmer 206 will command the throttle position angle profiles and engine rpm. Measured torque at indicator 251 is the test criterion or the determining factor in deciding whether the engine being tested is acceptable or should be rejected. As an example, assume that during a hot-test of engine 26, dynamometer unit 138 is commanded by programmer 206 to produce an engine rpm of 2500, as indicated by sensor 152 and that the programmer also commands throttle servo 207 to set throttle 208 at a ⅓ opening angle. With these settings the torque as measured by indicator 251 should be, say, 100 foot pounds. Should the indicated torque by only 85 foot pounds because of a defect in the engine being tested, the dynamometer will still maintain a 2500 rpm speed, and the throttle would remain at the ⅓ setting.

Alternatively, the arrangement could be such that a low torque reading would cause the throttle servo to open the throttle until the torque reading is back to 100 foot pounds, and the additional opening angle of the throttle used as the test criterion. However, it is generally recognized that torque sensing is advantageous for determining engine capabilities because of its high resolution characteristics for sensitivity as compared with throttle settings. Moreover, combined torque and speed readings enable horsepower to be directly measured.

Measurement of torque by pressure differential sensing has been found to be particularly accurate and reliable. One reason for this accuracy is that a volumetric device is being sensed. Secondly, the fact that differentials are being measured eliminates leakage as a factor in accuracy, slight leakage being normal in a hydraulic system. Thirdly, a differential pressure measurement gives a good dynamic or running level of torque, tracking changes with minimum error.

We claim:

1. In a test stand for vehicle engines, means supporting an engine to be tested, and a hydrostatic system comprising a fixed displacement motor connected to the engine crankshaft and a variable displacement pump spaced from said motor and having motive means for driving it, said system being a closed hydraulic loop system connecting said motor and pump whereby the engine may be selectively cold-tested or hot-tested, the motor during hot-testing acting as a pump and the pump acting as a motor, means for adjusting the displacement of said pump, and a control loop system for said pump adjusting means to simulate different load or inertia conditions.

2. The combination as set forth in claim 1, wherein said control loop system is closed.

3. The combination according to claim 1, wherein said control loop system is open, and fixed mechanical stops on said variable displacement pump to permit repetitive accuracy at selected test speed settings.

4. The combination as set forth in claim 1, said closed hydraulic loop system being unobstructed in either direction throughout its extent.

5. The combination according to claim 4, said fixed displacement motor having two main motive connections, and a device for sensing the pressure differential between said motive connections, whereby positive or negative torque may be indicated.

6. The combination according to claim 1, said fixed displacement motor having two main motive connections, and a device for sensing the pressure differential between said motive connections, whereby positive or negative torque may be indicated.

7. The combination according to claim 1, said motive means for driving the variable displacement pump comprising an electric motor, said system being in a plant having a supply bus with which said motor is connected, whereby during hot-testing of the engine being tested said motor will act as a generator and supply electric power to said supply bus.

8. In a hydrostatic drive-dynamometer system for hot-testing or cold-testing vehicle engines, a fixed displacement motor connected to the engine crankshaft and having two main motive connections, a variable displacement pump spaced from said motor and having motive means for driving it, said system being a closed hydraulic loop system unobstructed in either direction throughout its extent connecting said motor and pump whereby the engine may be selectively cold-tested or hot-tested, the motor during hot-testing acting as a pump and the pump acting as a motor, a servo controller for said variable displacement pump, a programmer connected to said servo controller for commanding engine speed, a speed feedback sensor connecting said fixed displacement motor with said servo controller, a throttle servo connected to the engine carbureto, a connection between said programmer and said throttle servo, and a pressure differential sensor connected to the motive connections of said fixed displacement motor for indicating positive or negative torque.

9. The combination according to claim 8, said motive means for driving the variable displacement pump comprising an electric motor, said system being in a plant having a supply bus with which said motor is connected, whereby during hot-testing of the engine being tested said motor will act as a generator and supply electric power to said supply bus.

10. In a test stand for vehicle engines, means supporting an engine to be tested, and a hydrostatic system comprising a fixed displacement motor unit and a variable displacement pump unit, one of said units being connected to the engine crankshaft and the other spaced from the first unit and having motive means for driving it, said system being a closed hydraulic loop system connecting said motor and pump whereby the engine may be selectively cold-tested or hot-tested, the motor during hot-testing acting as a pump and the pump acting as a motor, means for adjusting the displacement of said pump, and a control loop system for said pump adjusting means to simulate different load or inertia conditions.

11. The combination according to claim 10, said motive means for driving the variable displacement pump comprising an electric motor, said system being in a plant having a supply bus with which said motor is connected, whereby during hot-testing of the engine being tested said motor will act as a generator and supply electric power to said supply bus.

12. In a hydrostatic drive-dynamometer system for hot-testing or cold-testing vehicle engines, a first fluid unit connected to the engine crankshaft, a second fluid unit spaced from said first fluid unit, one of said units comprising a fixed displacement motor having two main motive connections, the other unit comprising a variable displacement pump spaced from the motor and having motive means for driving it, said system being a closed hydraulic loop system unobstructed in either direction throughout its extent connecting said motor and pump whereby the engine may be selectively hot-tested or cold-tested, the motor, during hot-testing acting as a pump and the pump acting as a motor, a servo controller for said variable displacement pump, a programmer connected to said servo controller for commanding engine speed, a speed feedback sensor connecting said fixed displacement motor with said servo controller, a throttle servo connected to the engine carburetor, a connection between said programmer and said throttle servo, and a pressure differential sensor connected to the motive connections of said fixed displacement motor for indicating positive or negative torque.

13. The combination according to claim 12, said motive means for driving the variable displacement pump comprising an electric motor, said system being in a plant having a supply bus with which said motor is connected, whereby during hot-testing of the engine being tested said motor will act as a generator and supply electric power to said supply bus.

* * * * *